(12) United States Patent
Tanaka

(10) Patent No.: US 8,531,682 B2
(45) Date of Patent: Sep. 10, 2013

(54) INFORMATION PROCESSING APPARATUS, CONTROL METHOD, AND COMPUTER-READABLE STORAGE MEDIUM

(75) Inventor: Satoshi Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 527 days.

(21) Appl. No.: 12/779,774

(22) Filed: May 13, 2010

(65) Prior Publication Data

US 2010/0302565 A1   Dec. 2, 2010

(30) Foreign Application Priority Data

May 29, 2009 (JP) .................................. 2009-130851

(51) Int. Cl.
*H04N 1/40* (2006.01)

(52) U.S. Cl.
USPC .......................................... 358/1.1; 358/468

(58) Field of Classification Search
USPC ...................... 358/1.9, 2.1, 1.1, 528, 448–449, 358/527, 468, 400, 500, 296, 304
See application file for complete search history.

(56) References Cited

U.S. PATENT DOCUMENTS

| | | | | |
|---|---|---|---|---|
| 4,947,269 A | * | 8/1990 | Yamada | 358/448 |
| 5,001,574 A | * | 3/1991 | Shimizu et al. | 358/448 |
| 5,602,651 A | * | 2/1997 | Tabata et al. | 358/448 |
| 6,927,865 B1 | | 8/2005 | Kujirai et al. | |

FOREIGN PATENT DOCUMENTS

| | | |
|---|---|---|
| CN | 101100252 A | 1/2008 |
| JP | 2001-051814 A | 2/2001 |
| JP | 2001-067347 A | 3/2001 |
| JP | 2006252528 A | 9/2006 |

* cited by examiner

*Primary Examiner* — Thomas D Lee
*Assistant Examiner* — Stephen M Brinich
(74) *Attorney, Agent, or Firm* — Canon U.S.A., Inc. IP Division

(57) ABSTRACT

An information processing apparatus which can be connected to a printing apparatus and a post-processing apparatus configured to perform post-processing on a sheet output from the printing apparatus includes an identification unit configured to identify a size of the sheet to be changed by executing first post-processing to the sheet output from the printing apparatus, a designation unit configured to designate a position on which second post-processing is executed to the sheet to which the first post-processing has been executed, and a display control unit configured to display a preview image for identifying a position on which the second post-processing is executed with respect to the size of the sheet identified by the identification unit based on the size of the sheet identified by the identification unit and the position on which the second post-processing is executed.

7 Claims, 15 Drawing Sheets

FIG.4

| NO | ATTRIBUTE INFORMATION | | APPLICATION |
|---|---|---|---|
| 1 | PRINT METHOD | ONE-SIDED/TWO-SIDED/ BOOKBINDING PRINTING | |
| 2 | PAPER SIZE | ORIGINAL SIZE/ FIXED SIZE | · DESIGNATE Z-FOLDING WHEN "A4+A3", "B4+B3", AND "LETTER+ LEDGER (11x17)" IS DESIGNATED<br>· AUTOMATICALLY SELECT ORIGINAL SIZE OF CHAPTER 1/PAGE 1 WHEN BOOKBINDING PRINT OR N-UP PRINT IS DESIGNATED |
| 3 | PAPER ORIENTATION | PORTRAIT/ LANDSCAPE | · SELECTABLE ONLY FOR FIXED SIZE |
| 4 | BINDING MARGIN/ BINDING DIRECTION | | · SHIFT/ENLARGE-REDUCE DESIGNATION IS FEASIBLE |
| 5 | N-UP PRINT | PAGE NUMBER/ PLACEMENT ORDER/ BOARDER LINE/ PLACEMENT POSITION | · 9 PATTERNS ARE AVAILABLE IN PLACEMENT POSITION<br>· DIRECT PRINT DESIGNATION IS FEASIBLE |
| 6 | ENLARGE/REDUCE | ON/OFF | · AUTOMATICALLY DESIGNATE ON OR OFF WHEN FIXED PAPER SIZE OR N-UP PRINT IS SELECTED |
| 7 | WATERMARK | | · INDEPENDENTLY DESIGNATABLE FOR EACH LOGICAL PAGE AND PHYSICAL PAGE<br>· APPLICABLE TO ALL CHAPTERS/ALL PAGES |
| 8 | HEADER/FOOTER | | · INDEPENDENTLY DESIGNATABLE FOR EACH LOGICAL PAGE AND PHYSICAL PAGE<br>· APPLICABLE TO ALL CHAPTERS/ALL PAGES |
| 9 | PAPER DISCHARGE METHOD | STAPLE/PUNCH HOLE | · STAPLE/PUNCH IS AVAILABLE ONLY FOR ONE-SIDED/TWO SIDED PRINTING<br>· STAPLE IS 1 PORTION OR 2 PORTIONS |
| 10 | DETAILS OF BOOKBINDING | OPENING DIRECTION/ SADDLE STITCH/ENLARGE- REDUCE DESIGNATION/ BINDING MARGIN/ SEPARATE VOLUME | · ONLY AVAILABLE FOR BOOKBINDING PRINT |
| 11 | FRONT COVER/ BACK COVER | | · DESIGNATE PRINTING OF FRONT COVER 1/2 AND BACK COVER 1/2<br>· DESIGNATE PAPER FEED PORT (INCLUDING INSERTER) |
| 12 | INDEX SHEET | | · CHARACTER STRING PRINTING TO INDEX PORTION AND ANNOTATION ON INDEX SHEET ARE SETTABLE<br>· UNDESIGNATABLE FOR BOOKBINDING PRINT |
| 13 | INTERLEAF | | · DESIGNATE PAPER FEED PORT (INCLUDING INSERTER)<br>· PRINTING OF ORIGINAL DATA ON INSERTED SHEET IS FEASIBLE<br>· UNDESIGNATABLE FOR BOOKBINDING PRINT |
| 14 | CHAPTER BREAK | "NO"/"PAGE-BY-PAGE BREAK"/"SHEET-BY- SHEET BREAK" | · FIXED TO "PAPER BREAK" WHEN INDEX SHEET OR INTERLEAF IS DESIGNATED<br>· UNDESIGNATABLE FOR ONE-SIDED PRINTING |
| 15 | POST-PROCESSING METHOD 1 | CUT/CUT SIZE | · "CUT" OR "NO CUT"<br>· DESIGNATE SIZE SMALLER THAN PAPER SIZE FROM STANDARD SIZE AS CUT SIZE, OR INPUT CUT SIZE |
| 16 | POST-PROCESSING METHOD 2 | CREASE/ CREASE POSITION | · "CREASE" OR "NOT CREASE"<br>· CREASE POSITION IS DESIGNATED FROM UPPER LEFT SIDE OF PAPER AFTER CUTTING |

FIG.5

| NO | ATTRIBUTE INFORMATION | | APPLICATION |
|---|---|---|---|
| 1 | PAPER SIZE | ORIGINAL SIZE/ FIXED SIZE | · AUTOMATICALLY DESIGNATE "PAPER BREAK" WHEN FIXED SIZE IS SELECTED<br>· CHANGEABLE FOR ONLY DESIGNATED PAPER WHEN PLURAL TYPES OF PAPER ARE SELECTED IN BOOK, AND CHANGE OF PAPER SIZE IS FEASIBLE FOR DESIGNATION OF BOOK ADJUSTMENT |
| 2 | PAPER ORIENTATION | PORTRAIT/ LANDSCAPE | · SELECTABLE ONLY FOR FIXED SIZE |
| 3 | N-UP PRINT DESIGNATION | PAGE NUMBER/ PLACEMENT ORDER/ BOARDER LINE/ PLACEMENT POSITION | · 9 PATTERNS ARE AVAILABLE IN PLACEMENT POSITION<br>· DIRECT PRINT DESIGNATION IS FEASIBLE |
| 4 | ENLARGE/ REDUCE | ON/OFF | · AUTOMATICALLY DESIGNATE ON OR OFF WHEN FIXED PAPER SIZE OR N-UP PRINT IS SELECTED |
| 5 | WATERMARK | DISPLAY/ NON-DISPLAY | · DETERMINE WHETHER ALL WATERMARKS DESIGNATED BY BOOK ARE DISPLAYED |
| 6 | HEADER/FOOTER | DISPLAY/ NON-DISPLAY | · DETERMINE WHETHER ALL HEADERS/FOOTERS DESIGNATED BY BOOK ARE DISPLAYED |
| 7 | PAPER DISCHARGE METHOD | STAPLE | · "OFF" IS SELECTABLE WHEN STAPLE IS DESIGNATED BY BOOK.<br>DEFAULT SETTING IS "ON" |

FIG.6

| NO | ATTRIBUTE INFORMATION | | APPLICATION |
|---|---|---|---|
| 1 | PAGE ROTATION DESIGNATION | | · SELECTABLE FROM 0/90/180/270 DEGREES |
| 2 | WATERMARK | DISPLAY/ NON DISPLAY | · DETERMINE WHETHER ALL WATERMARKS DESIGNATED BY BOOK ARE DISPLAYED |
| 3 | HEADER/ FOOTER | DISPLAY/ NON DISPLAY | · DETERMINE WHETHER ALL HEADERS/FOOTERS DESIGNATED BY BOOK ARE DISPLAYED |
| 4 | ZOOM | 50% - 200% | · DESIGNATE RELATIVE MAGNIFICATION WHEN 100% SIZE IS EQUAL TO VIRTUAL LOGICAL PAGE REGION |
| 5 | PLACEMENT DESIGNATION | | · SELECT ONE OF NINE FIXED PATTERNS OR ARBITRARY POSITION |
| 6 | ANNOTATION | | |
| 7 | VARIABLE ITEM | | |
| 8 | PAGE DIVISION | | |

INFORMATION PROCESSING APPARATUS, CONTROL METHOD, AND COMPUTER-READABLE STORAGE MEDIUM

BACKGROUND OF THE INVENTION

1. Field of the Invention

The present invention relates to a printing system and, more particularly, to a generation method of a print paper preview image in which print setting information is reflected.

2. Description of the Related Art

Conventionally, a post-processing apparatus executes post-processing such as cutting or folding with respect to a print product output from a printing apparatus such as a printer. One inconvenient thing in using the post-processing apparatus is that it is difficult for a user to recognize how the post-processing is reflected in an actual print product.

Japanese Patent Application Laid-Open No. 2001-67347 discusses a method for displaying a preview image in which post-processing is reflected so that a user can easily recognize a result of the post-processing. As another method, Japanese Patent Application Laid-Open No. 2001-51814 discusses a method for transmitting a page image to a post-processing apparatus and displaying a preview image on a panel of the post-processing apparatus.

However, a problem described below occurs if the conventional technique to generate a preview image, which incorporates the post-processing after the page image is set on a sheet-size image, is used.

For example, if a post-processing method for changing a size of a sheet by cutting the sheet is used, possibility of additional different post-processing which is further applied to the sheet whose size has been changed by cutting is not considered.

Thus, a user needs to make setting for the additional post-processing while imagining the size of the sheet which has been changed. Thus, the setting of the post-processing is difficult.

SUMMARY OF THE INVENTION

According to an aspect of the present invention, an information processing apparatus which can be connected to a printing apparatus and a post-processing apparatus configured to perform post-processing on a sheet output from the printing apparatus includes an identification unit configured to identify a size of the sheet to be changed by executing first post-processing to the sheet output from the printing apparatus, a designation unit configured to designate a position on which second post-processing is executed to the sheet to which the first post-processing has been executed, and a display control unit configured to display a preview image for identifying a position on which the second post-processing is executed with respect to the size of the sheet identified by the identification unit based on the size of the sheet identified by the identification unit and the position on which the second post-processing is executed.

According to an exemplary embodiment of the present invention, a user can easily set the post-processing.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates a list of book attributes.

FIG. 5 illustrates a list of chapter attributes.

FIG. 6 illustrates a list of page attributes.

DESCRIPTION OF THE EMBODIMENTS

Various exemplary embodiments, features, and aspects of the invention will be described in detail below with reference to the drawings.

First, an outline of a document processing system according to an exemplary embodiment of the present invention will be described referring to FIGS. 1 to 14. The document processing system includes an electronic original writer and a bookbinding application. The electronic original writer converts a data file generated according to a common application into an electronic original file. The bookbinding application provides a function for editing the electronic original file. Further, the document processing system can generate and edit a document including the generated data put together as one. Accordingly, operability of the document can be improved and the document can be efficiently edited.

Figure 1:
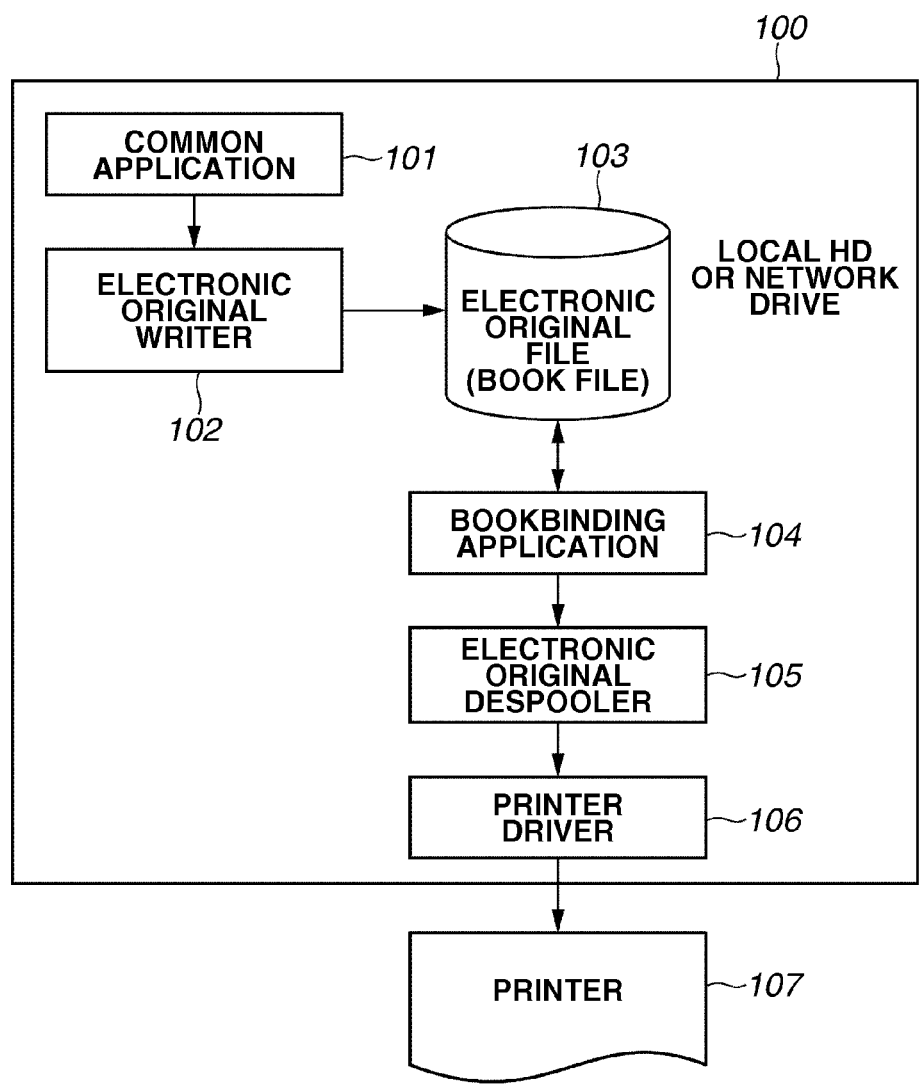
FIG. 1 illustrates an example of software configuration of a document processing system according to an exemplary embodiment.

FIG. 1 illustrates a software configuration of a document processing system according to the present exemplary embodiment. The document processing system is realized by a digital computer 100 (also referred to as a host computer) which is an exemplary embodiment of an information processing apparatus according to the present invention. A common application 101 illustrated in FIG. 1 is an application program that provides functions such as a word processing function, a spreadsheet function, and a text editing function, and also includes a print function of an operating system (OS).

The above described applications use a predetermined interface (usually referred to as Graphic Device Interface (GDI)) provided by the OS when application data is printed. In other words, the common application 101 transmits an output command (referred to as a GDI function) in a predetermined OS-dependent format to an output module of the OS which provides the above described interface, so as to print the application data. The output module that received the output command converts the output command into a format that can be processed by an output device such as a printer, and outputs the converted command (referred to as a device driver interface (DDI) function).

Since the format that can be processed by the output device varies depending on a type, manufacturer, and model of the device, a device driver is provided for each device. The OS converts a command using the device driver and generates print data. Then the generated print data is put together by a job language (JL) and a print job is generated accordingly. If the OS is Microsoft Windows of Microsoft Corporation, the output module is a GDI module.

An electronic original writer 102 is a modification of the above described device driver, and is a software module provided to realize the above described document processing system. The electronic original writer 102 is not intended for a specific output device, and converts the output command into a format that can be processed by a bookbinding application 104 described below in detail or a printer driver 106. The format after the conversion performed by the electronic original writer 102 is referred to as an electronic original format. Various formats can be used so long as each page can be expressed in a detail format. For example, the portable document format (PDF) of Adobe Systems Incorporated and the scalable vector graphics (SVG) can be used as the electronic original format.

When the electronic original writer 102 is used via the common application 101, the electronic original writer 102 is designated as the device driver for outputting data, and printing is executed. However, an electronic original file generated by the electronic original writer 102 is not in a complete electronic original file format. For this reason, the electronic original writer 102 is designated by the bookbinding application 104 as the device driver and application data is converted into an electronic original file under the management of the bookbinding application 104. The bookbinding application 104 changes a new but incomplete electronic original file generated by the electronic original writer 102 into an electronic original file having the form described below.

Hereinafter, if it is necessary to clearly differentiate the above described files, a file generated by the electronic original writer 102 is referred to as an "electronic original file" and an electronic original file which is given a structure by the bookbinding application 104 is referred to as a "book file". If it is not necessary to clearly differentiate the files, each of a document file generated by the application, an electronic original file, and a book file is referred to as a document file (or document data).

As described above, the electronic original writer 102 is designated as the device driver and data is printed using the common application 101, so that the application data is converted into an electronic original format, in a page unit, defined by the common application 101. The page defined by the common application 101 is hereinafter referred to as a logical page or an original page. Then, the logical page or the original page is stored in a storage medium, such as a hard disk, as an electronic original file 103. The hard disk can be a local drive of a computer that realizes the document processing system of the present exemplary embodiment or a drive provided on a network if the computer is connected to the network.

The bookbinding application 104 provides a user with a function for reading and editing the electronic original file (or the book file) 103. However, the bookbinding application 104 does not provide a function for editing contents of each page. Instead of such a function, the bookbinding application 104 provides a function for editing a chapter structure or a book structure which includes pages as the minimum unit.

When the book file 103 edited by the bookbinding application 104 is printed, an electronic original despooler 105 is started by the bookbinding application 104. The electronic original despooler 105 is a program module installed in the computer together with the bookbinding application. Further, the electronic original despooler 105 is a module for outputting drawing data to the printer driver when a book file used in the bookbinding application is printed. The electronic original despooler 105 reads out a designated book file from the hard disk. Further, to print each page in a format described in the book file that is read out, the electronic original despooler 105 generates an output command that matches the output module of the OS described above, and outputs the generated output command to an output module (not shown). At this time, the printer driver 106 for a printer 107 used as the output device is designated as the device driver.

The above described output module converts the received output command into a device command and outputs the device command to the printer driver 106 designated for the printer 107. Then the printer driver 106 converts the device command into a page description language command (print job) which can be interpreted by the printer 107. Then, the converted command is transmitted from the printer driver 106 to the printer 107 via a system spooler (not shown). The printer 107 prints an image corresponding to the command. If post-processing setting is included in the converted command, the set post-processing is executed by a post-processing apparatus connected to the printer 107 after the printing.

The post-processing apparatus is classified into an in-line finisher connected to the printer via a print product conveyance path through which a print product is output by the printer, and a near-line finisher and an off-line finisher which are not connected to the print product conveyance path of the printer. Although the near-line finisher is connected to the information processing apparatus or the printer via a network, the off-line finisher is not connected to other apparatuses via a network.

Figure 2:
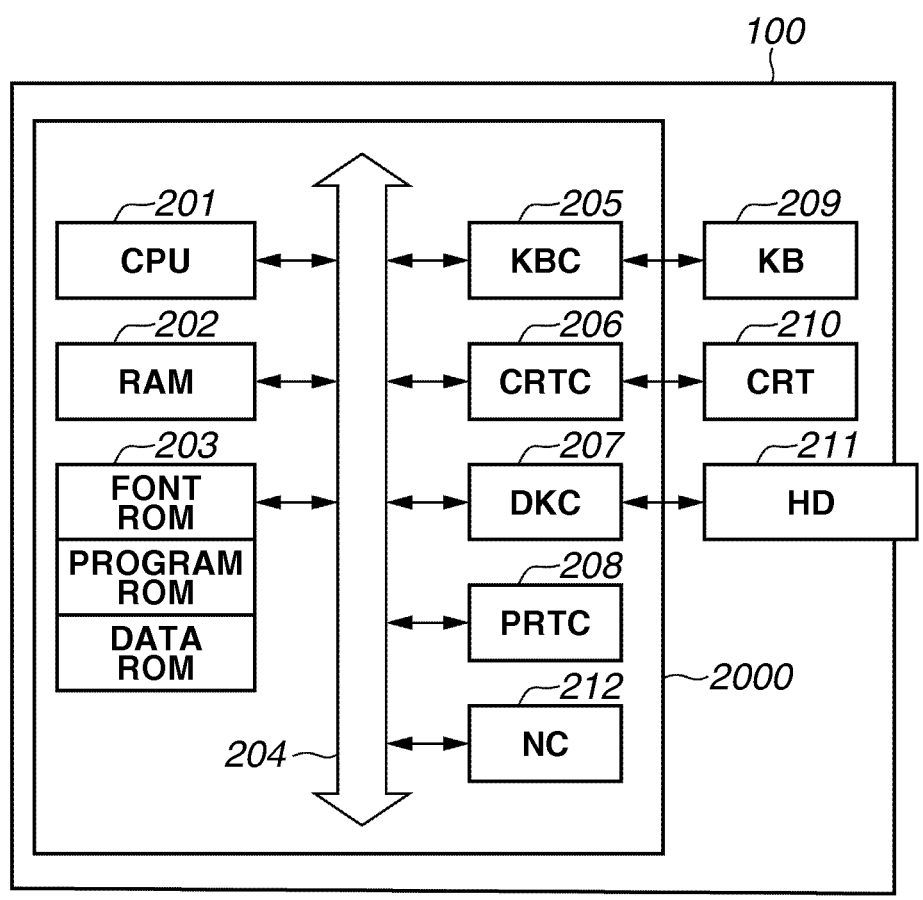
FIG. 2 illustrates an example of a hardware configuration that realizes the document processing system according to the present exemplary embodiment.

FIG. 2 is a hardware block diagram of the computer (information processing apparatus) 100. In FIG. 2, a central processing unit (CPU) 201 reads out the OS or a program, such as a common application or a bookbinding application, stored in a program read-only memory (ROM) in a ROM 203 and executes it. The CPU 201 can also execute a program loaded onto a random access memory (RAM) 202 from a hard disk 211. The CPU 201 realizes the software configuration illustrated in FIG. 1 and procedures of flowcharts described below.

The RAM 202 functions as a main memory and a work area of the CPU 201. A keyboard controller (KBC) 205 controls input via a keyboard 209 or a pointing device (not shown). A cathode ray tube (CRT) controller (CRTC) 206 controls display of a CRT display 210. A disk controller (DKC) 207 controls access with respect to a hard disk (HD) 211 or a floppy (registered trademark) disk (FD) that stores a boot program, various applications, font data, a user file, and an editing file described below. A printer controller (PRTC) 208 controls signals transmitted to or received from the connected printer 107. A network controller (NC) 212 is connected to the network and executes communication control when the computer 100 communicates with apparatuses connected to the network.

Prior to describing details of the bookbinding application 104, a data format of the above described book file will be described. The book file has a three-layer structure resembling a book made of sheets of paper. An upper layer is referred to as a "book" which resembles a book and defines an attribute concerning an entire book. An intermediate layer, subordinated to the upper layer, corresponds to a chapter of a book, and also referred to as a "chapter". Each "chapter" can define an attribute of each chapter. A lower layer corresponds to each page defined by an application program, and is referred to as a "page". Each "page" can define an attribute of each page. One book can include a plurality of chapters, and further, one chapter can include a plurality of pages.

Figure 3A:
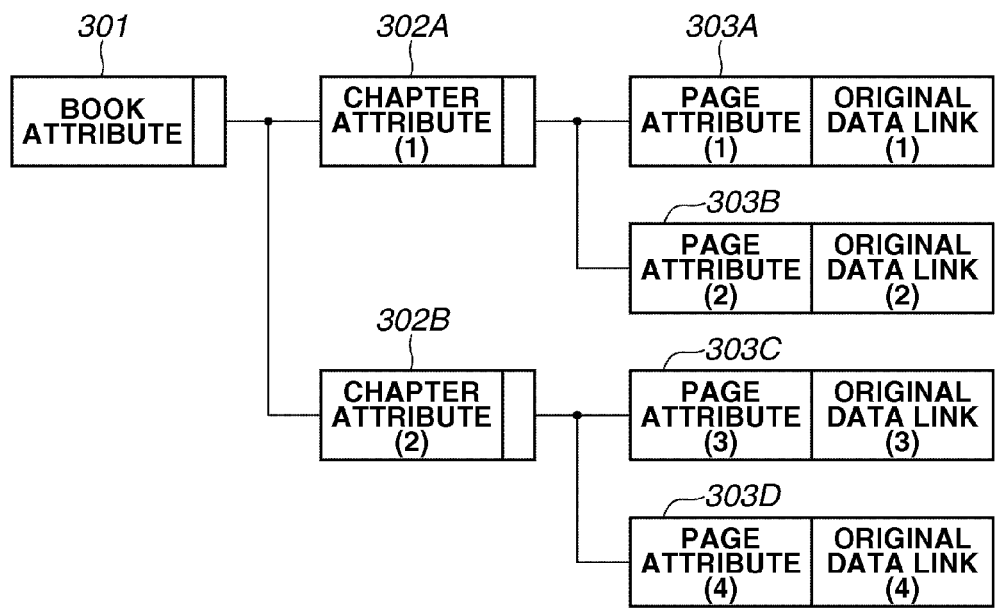
FIGS. 3A and 3B illustrate examples of a structure of a book file.
Figure 3B:
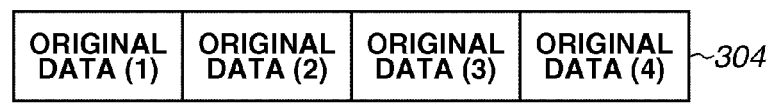

FIG. 3A illustrates an example format of a book file. As illustrated in FIG. 3A, the book file includes a book, chapters, and pages denoted by corresponding nodes. One book file includes one book. Each of the "book" and the "chapter" is a concept that defines a book structure, and includes a defined attribute value and a link to a lower layer as its entity. The "page" includes data of each page output by the application program as its entity. Thus, in addition to its attribute value, the page includes the entity of an original page (original page data) and a link to original page data.

A print page output to a paper medium may include a plurality of original pages. The structure of each print page is not displayed with a link and displayed as an attribute of each layer of the "book", the "chapter", or the "page".

In FIG. 3A, a book 301 defines its book attribute and includes two chapters 302A and 302B linked together. According to this link, the chapters 302A and 302B are displayed as included in the book 301. The chapter 302A includes pages 303A and 303B which are linked together. The page 303A defines its attribute value and includes a link to corresponding original page data (1) as its entity. The page 303B defines its attribute value and includes a link to corresponding original page data (2) as its entity. These links correspond to original page data (1) and (2) of original page data 304 illustrated in FIG. 3B. From FIG. 3B, it is understood that the entity of the pages 303A and 303B is the original page data (1) and (2).

FIG. 4 illustrates an example list of the book attributes. If an item can be defined in both upper and lower layers, the attribute value of the lower layer will be adopted with priority. Thus, an item included only in the book attribute has an attribute value effective in the entire book. However, as for an item defined in both the book attribute and the lower layer, the item included in the book item will serve as a predetermined value only when the item is not defined in the lower layer. In the example illustrated in FIG. 4, each item may not correspond to a specific single item and may include a plurality of relevant items.

FIG. 5 illustrates an example list of the chapter attributes and FIG. 6 illustrates an example list of the page attributes. The relation between the chapter attributes and the page attributes is similar to the relation between the book attributes and the lower layer attributes.

As is apparent from FIGS. 4 to 6, a total of seven items are unique to the book attributes. The items are: "print method", "details of bookbinding", "front cover/back cover", "index sheet", "interleaf", "chapter break", and "post-processing method". These items are defined throughout the book. The "print method" attribute allows a user to designate "one-sided printing", "two-sided printing", or "bookbinding printing". The bookbinding printing is a print method for printing sheets in a form enabling bookbinding processes such as bundling a designated number of printed sheets, folding the sheets, and stitching the sheets. The "details of bookbinding" attribute allows the user to designate an opening direction of a book and the number of sheets to be bundled if the "bookbinding print" is designated.

The "front cover/back cover" attribute enables the user to add a front cover sheet and a back cover sheet to an electronic original file to be printed as a book and to designate contents to be printed on the added covers. The "index sheet" attribute enables the user to designate an insertion of a tabbed index sheet, as a break of a chapter, which can be separately prepared for the printing apparatus. The "index sheet" attribute also allows the user to designate contents to be printed on an index tabbed portion. The "index sheet" attribute is valid if the printing apparatus includes an inserter which has a function of inserting a specially-provided sheet to a predetermined position, or if the printing apparatus is provided with a plurality of paper feed cassettes. The same thing is applied to the "interleaf" attribute.

The "interleaf" attribute enables the user to designate, as a break of a chapter, insertion of a sheet supplied from an inserter or a paper feed cassette. If an interleaf is inserted, a paper feeding source is designated.

The "chapter break" attribute enables the user to designate use of a new sheet, use of a new print page, or nothing at a breakpoint of the chapter. When the "one-sided printing" is selected, there is no difference between use of a new sheet and use of a new print page. If the user designates "use a new sheet" when the "two-sided printing" is selected, consecutive chapters are not printed on one sheet. However, if the user designates "use a new print page", then consecutive chapters may be printed on both sides of a sheet.

A post-processing method 1 (a first post-processing method) includes setting information concerning post-processing executed to a sheet output from the printer. According to the example illustrated in FIG. 4, the user can select whether to cut/not cut the sheet. If the user selects the cutting, the user can further designate the size of the sheet obtained by the cutting.

A post-processing method 2 (a second post-processing method) includes setting information concerning post-processing executed to the sheet that has been subjected to the post-processing method 1. According to the example illustrated in FIG. 4, the user can select whether to crease/not crease the sheet. If the user selects the creasing, the user can further designate a crease position. The creasing indicates processing for arranging a folding line of a sheet.

The chapter attributes do not include any items unique to the chapter. All of the chapter attributes are included in the book attributes. Accordingly, if the definition in the chapter attributes disagrees with the definition in the book attributes, the value defined in the chapter attribute is prioritized over the value defined in the book attributes. Five items are commonly included in the book attributes and the chapter attributes. They are "paper size", "paper orientation", "N-up print designation", "enlarge/reduce", and "paper discharge method". The "N-up print designation" attribute allows the user to designate the number of original pages placed on one print page. For example, the user can select a page layout from 1*1, 1*2, 2*2, 3*3, and 4*4. The "paper discharge method" attribute allows the user to determine whether to staple the discharged sheet. Effectiveness of this attribute depends on whether the printing apparatus includes a staple function.

Referring to FIG. 6, items unique to the page attributes include "page rotation", "zoom", "placement designation", "annotation", and "page division". The "page rotation" attribute enables the user to designate a rotational angle of an original page that is placed on a print page. The "zoom" attribute enables the user to designate a zooming ratio of an original page. The zooming ratio defines a size relative to a virtual logical page region (i.e., 100%). The virtual logical page region is a region occupied by one original page when the original page is placed according to, for example, the N-up designation. For example, if the selected page layout is 1*1, the virtual logical page region corresponds to one printed page. If the selected page layout is 1*2, the virtual logical page region is a reduced region which has each side equivalent to approximately 70% of a corresponding side of one printed page.

Two attribute items "watermark" and "header/footer" are commonly included in the "book", "chapter", and the "page" attributes. The "watermark" is an image or a character string which can be separately designated and superposed on data generated by an application and printed. The "header/footer" is a watermark which can be added to a top margin or a bottom margin of each page to be printed. The header/footer includes items which can be designated by variables such as a page number and date/time. The contents which can be designated in the "watermark" attribute and the "header/footer" attribute are common in the chapter attributes and the page attributes. However, the book attributes are different from the chapter attributes and the page attributes. In the book attributes, the user can set the contents of the "watermark" and the "header/footer", and designate how to print the "watermark" and the "header/footer" throughout the book. On the other hand, in the chapter attributes and the page attributes, the user can designate whether to print the "watermark" and the "header/footer" set in the book attributes on each "chapter" or each "page".

The book file has the above described structure and contents. Next, a generation procedure of a book file according to the bookbinding application 104 and the electronic original writer 102 will be described. The generation procedure of a book file partly constitutes a book file editing operation performed by the bookbinding application 104.

Figure 7:
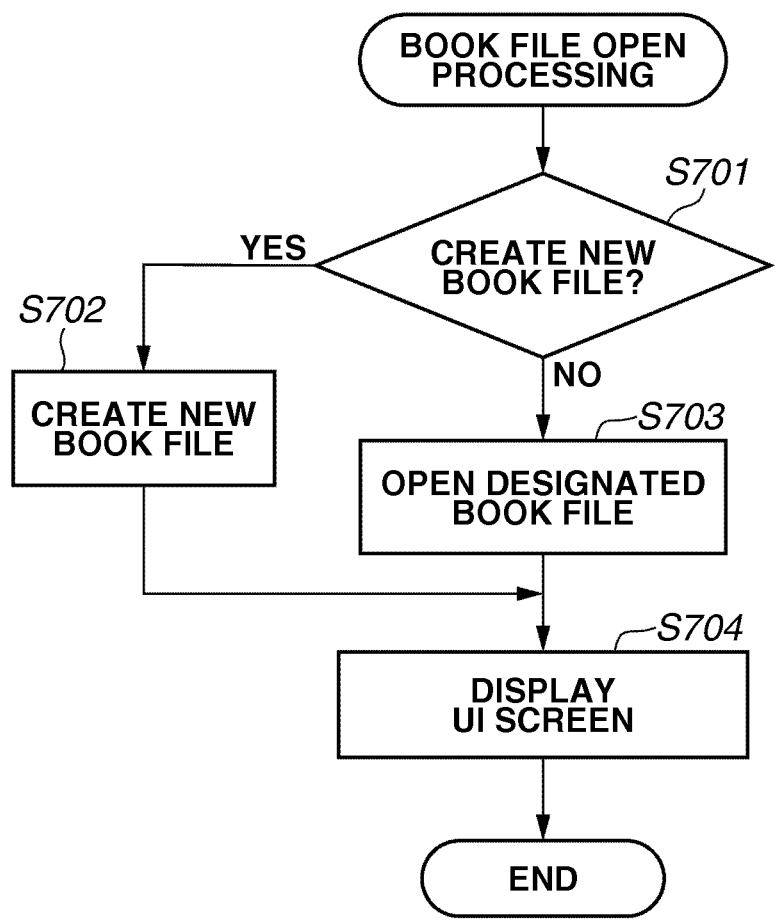
FIG. 7 is a flowchart illustrating an example of procedures for opening a book file.

FIG. 7 is a flowchart illustrating an example procedure for opening a book file performed by the bookbinding application 104. The processing in each step of the flowchart is realized by the CPU 201 reading out a program related to the processing from the memory and executing the program.

In step S701, the bookbinding application 104 determines whether a book file to be opened is a new file or an already existing file.

Figure 11:
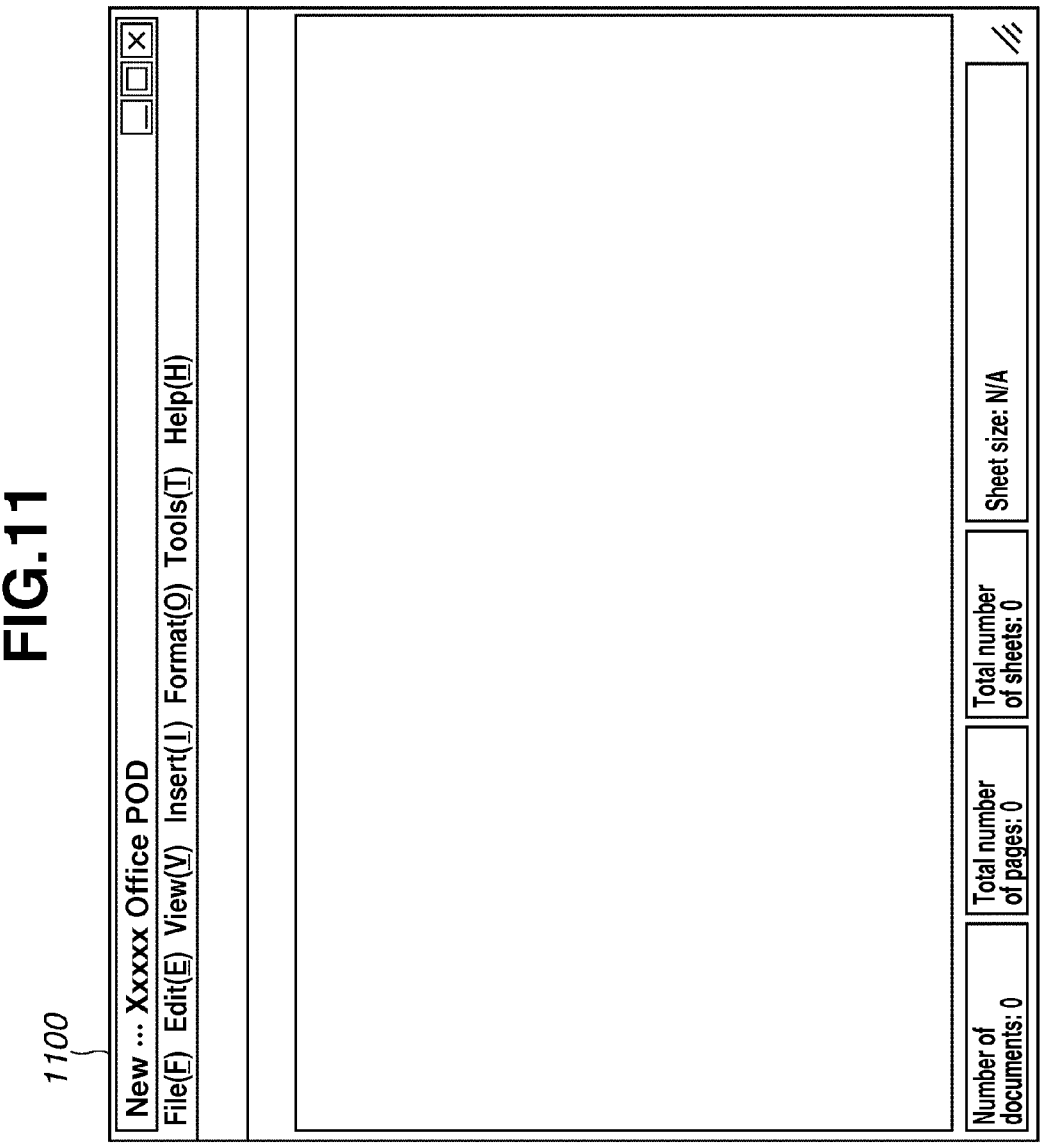
FIG. 11 illustrates an example of a UI screen when a new book file is opened.

If the book file to be opened is a new file (YES in step S701), the process proceeds to step S702. In step S702, the bookbinding application 104 generates a new book file that does not include a chapter. The newly generated book file includes, according to the example illustrated in FIG. 3, only the book node 301 and does not have a link to a chapter node. A set of book attributes for new file which is prepared in advance is used as the new book attributes. In step S704, the bookbinding application 104 displays a user interface (UI) screen for editing the new book file. FIG. 11 illustrates an example of the UI screen which is displayed when a new book file is generated. In this case, since the book file does not include any substantial content, nothing is displayed on a UI screen 1100.

Figure 10:
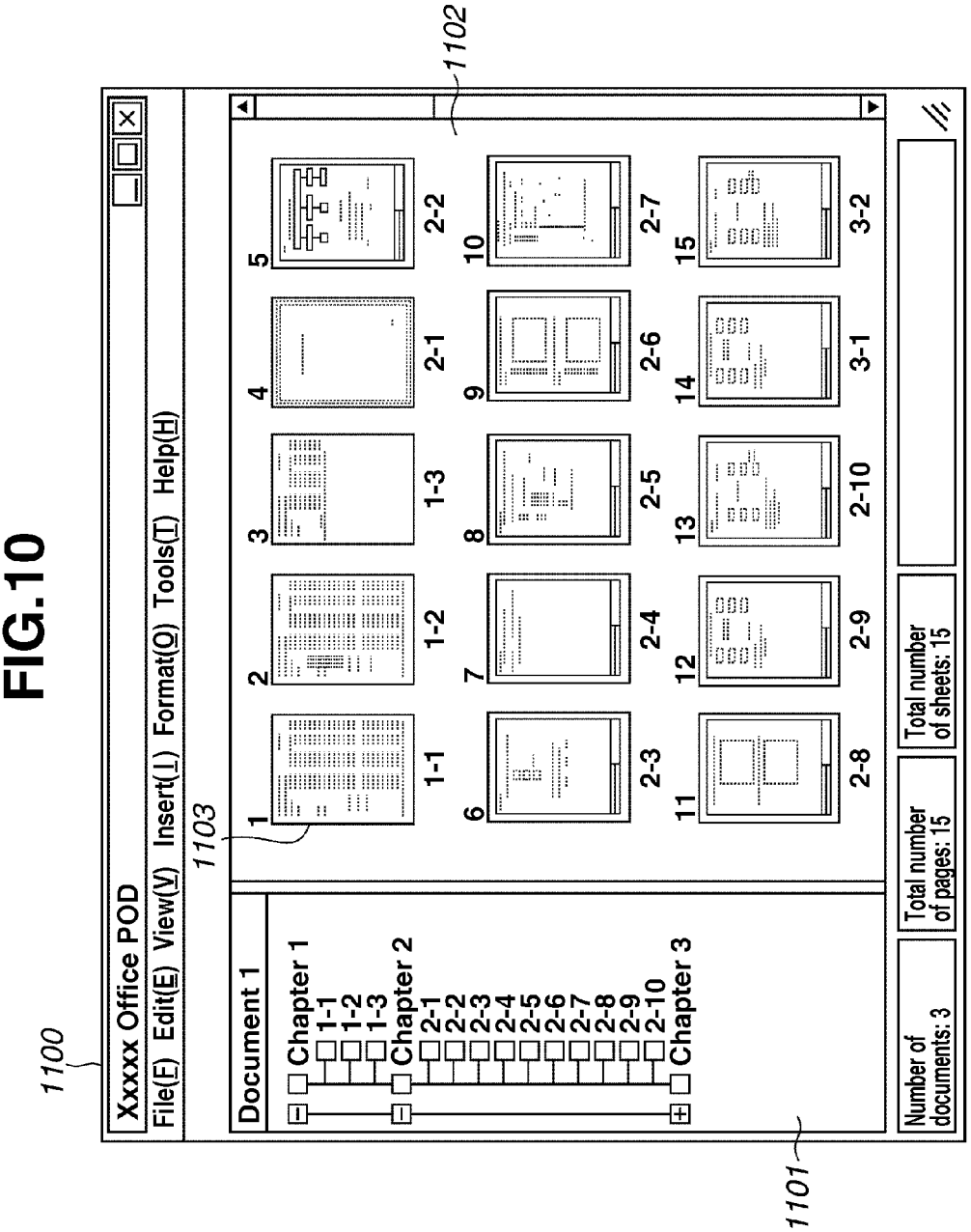
FIG. 10 illustrates an example of a user interface (UI) screen when an existing book file is opened.

On the other hand, if the book file to be opened is an existing file (NO in step S701), the process proceeds to step S703. In step S703, the bookbinding application 104 opens the designated book file and the structure, attribute, and contents of the book file are displayed on the UI screen 1100. FIG. 10 illustrates an example of the UI screen 1100 displaying the existing book file that has been designated. The UI screen 1100 includes a tree section 1101 that indicates a book structure and a preview section 1102 that displays a state of the printed pages. The tree section 1101 displays all the chapters included in the book and the pages included in each chapter in a tree structure as illustrated in FIG. 3A. The pages displayed in the tree section 1101 are original pages. Further, a reduced image of each print page is displayed in the preview section 1102. The display order in the preview section 1102 reflects the book structure.

Application data converted into an electronic original file by the electronic original writer 102 can be added, as a new chapter, to an opened book file. This function is referred to as an "electronic original import function". When an electronic original is imported to the book file newly generated according to the procedures illustrated in FIG. 7, the book file possesses an entity. This electronic original import function is started when the user drags and drops any application data to the screen illustrated in FIG. 10.

Figure 8:
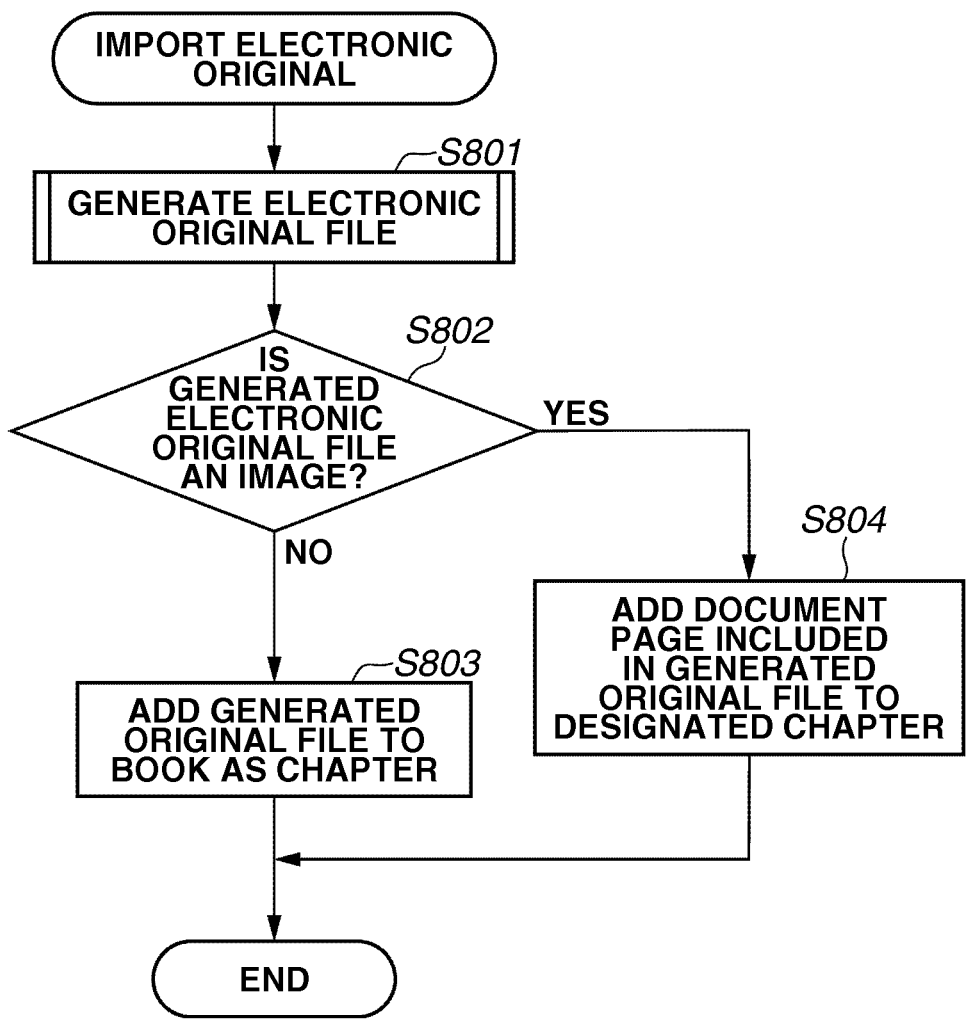
FIG. 8 is a flowchart illustrating an example of procedures for importing electronic original data.

FIG. 8 illustrates import procedures of the electronic original. In step S801, the bookbinding application 104 starts an application program that generated the designated application data and designates the electronic original writer 102 as the device driver. The electronic original writer 102 converts the application data into electronic original data.

In step S802, when the conversion is finished, the bookbinding application 104 determines whether the converted data is image data. If the OS is Windows, the determination is performed based on a file extension of the application data. For example, if the extension is "bmp", the bookbinding application 104 determines that the data is bitmap data of Windows. If the extension is "jpg", the bookbinding application 104 determines that the generated data is Joint Photographic Experts Group (JPEG) compression image data. Further, if the extension is "tiff", the bookbinding application 104 determines that the generated data is in Tagged Image Format (TIFF). If the image data is in any of the above described formats, since the electronic original file can be directly generated from the image data, the activation of the application performed in step S801 is not necessary, so that the processing in step S801 can be omitted.

If the converted data is not image data (NO in step S802), the process proceeds to step S803. In step S803, the bookbinding application 104 adds the electronic original file generated in step S801 to the book of the current open book file as a new chapter. As for the chapter attributes common to the book attributes, the values of the book attributes are copied to the chapter attributes. As for the chapter attributes not common to the book attributes, predefined values are set to the attributes.

In step S802, if the converted data is image data (YES in step S802), the process proceeds to step S804. In step S804, the bookbinding application 104 basically does not add a new chapter and adds each original page included in the electronic original file generated in step S801 to the designated chapter. However, if the book file is a newly generated file, a new chapter is generated and each page of the electronic original file is added as a page that belongs to the chapter. The page attributes includes attribute values common to the page attributes and upper layer attributes or attribute values which are defined by the application data and included in the electronic original file. For example, if the "N-up print designation" is designated in the application data, the attribute value of the "N-up designation" can be continuously used. In this manner, a new book file is generated or a new chapter is added.

Figure 9:
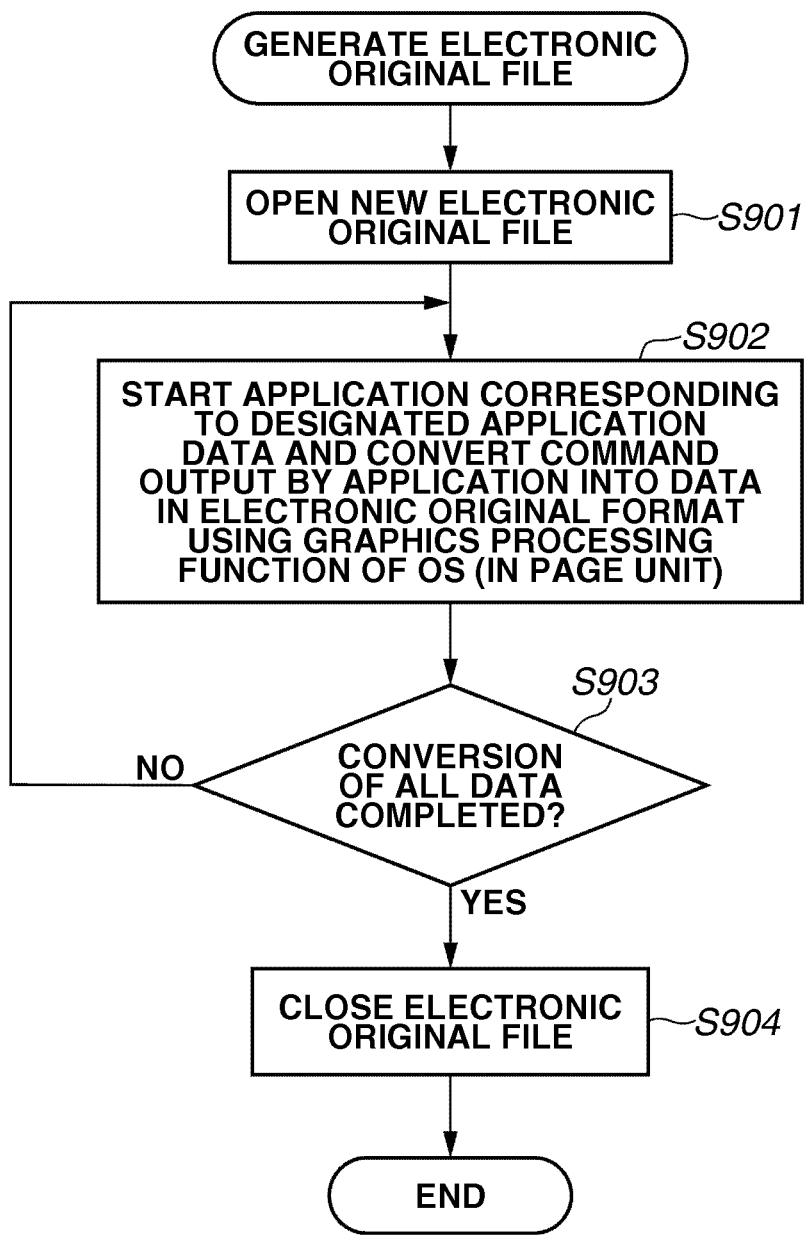
FIG. 9 is a flowchart illustrating procedures for generating an electronic original file.

FIG. 9 is a flowchart illustrating procedures for generating an electronic original file by the electronic original writer 102 in step S801 in FIG. 8. In step S901, the electronic original writer 102 generates and opens a new electronic original file.

In step S902, the electronic original writer 102 starts an application corresponding to the designated application data, and the application transmits an output command to the output module of the OS while using the electronic original writer 102 as the device driver. The output module causes the electronic original writer 102 to convert the received output command into data in an electronic original format and outputs the converted data.

In step S903, the electronic original writer 102 determines whether the conversion processing has been completed for all the designated data. If the electronic original writer 102 determines that the conversion for all the designated data has been completed (YES in step S903), the process proceeds to step S904. In step S904, the electronic original writer 102 closes the electronic original file. An electronic original file generated by the electronic original writer 102 is a file including the entity of the original page data illustrated in FIG. 3B.

As described above, a book file is generated from application data. The user can perform the following editing operations for each chapter and each page of the book file generated as described above.
(1) new addition
(2) deletion
(3) copy
(4) cut
(5) paste
(6) shift
(7) change of chapter name
(8) renumber/rename of page
(9) cover insertion
(10) interleaf insertion
(11) index sheet insertion
(12) original page layout Additionally, the user can cancel an editing operation which has been previously set, or execute a previously cancelled operation. According to these editing functions, the user can perform various editing operations including, for example, integration of a plurality of book files, relocation of a chapter or a page in a book file, deletion of a chapter or a page in a book file, layout change of an original page, and insertion of an interleaf or an index sheet. When the user performs the above described operation, a result of the operation is reflected to the attributes illustrated in FIGS. 4 and 5, or the structure of the book file. For example, if the user executes an addition operation of a new blank page, then, a blank page is inserted to a designated portion. Then, the inserted blank page is regarded as an original page. Further, if the user changes the layout of an original page, the content of the change is reflected to the attributes such as print method, N-up print, front cover/back cover, index sheet, interleaf, and chapter break.

A book file which is generated and edited as described above is ultimately printed. If the user selects a file menu from the UI screen 1100 of the bookbinding application illustrated in FIG. 10 and designates printing of a selected file, a designated output device prints the selected file. In this case, the bookbinding application 104 generates a job ticket from the book file which is currently opened, and transmits the job ticket to the electronic original despooler 105. The electronic original despooler 105 converts the received job ticket into an output command of the OS (e.g., GDI command of Windows), and then transmits the output command to an output module (e.g., a GDI module). The output module generates a command suitable for the device by the designated printer driver 106, and transmits the generated command to the device.

A job ticket is data which has a structure including the original page as the minimum unit. The structure of a job ticket defines the layout of the original pages on a sheet. One job ticket is issued for one job. Thus, a job ticket includes a "document" node which defines the attributes of the entire document, such as two-sided print/one-sided print on an uppermost-layer. A paper node, subordinating to the document node, includes, for example, an identifier of paper to be used and designation of a paper feed port of a printer. A node of a sheet to be printed on the paper belongs to each paper node. One sheet corresponds to one sheet of paper. A printed page (i.e., a physical page) belongs to each sheet. If the print method is one-sided printing, one physical page belongs to one sheet. If the print method is two-sided printing, two physical pages belongs to one sheet. An original page placed on a physical page belongs to that physical page. Further, attributes for a physical page includes a layout of the original page.

The electronic original despooler 105 converts the above described job ticket into an output command to be supplied to the output module.

As described above, when the bookbinding application 104 opens a book file, the UI screen 1100 illustrated in FIG. 10 is displayed. A tree representing a structure of the opened book (hereinafter referred to as a "target book") is displayed in the tree section 1101. Three display methods are prepared for the preview section 1102, which can be selected according to the user's designation.

A first mode is referred to as an "original view mode" to display original pages as they are. According to this mode, reduced images of the original pages that belong to the target book are displayed as preview images. The print setting information such as the layout is not reflected in the display in the preview section 1102.

A second mode is referred to as a "print view mode". According to this mode, a preview image of the original page (or a print page including the original page) in which the print setting information such as the layout is reflected is displayed in the preview section 1102.

A third mode is referred to as a "simple print view mode". According to this mode, contents of each original page is not reflected but only the layout is reflected in the display in the preview section 1102.

Next, an exemplary embodiment of the above described system according to the present invention will be described. A generation method of a preview image according to the present invention when a post-processing method for changing a paper size is applied will be described. If a user selects the print view mode so as to display a preview image in the preview section 1102, preview image generation processing is performed according to a method described in the present invention. The preview image generation processing according to the present exemplary embodiment will be described below referring to the flowcharts illustrated in FIGS. 12 and 13.

Figure 12:
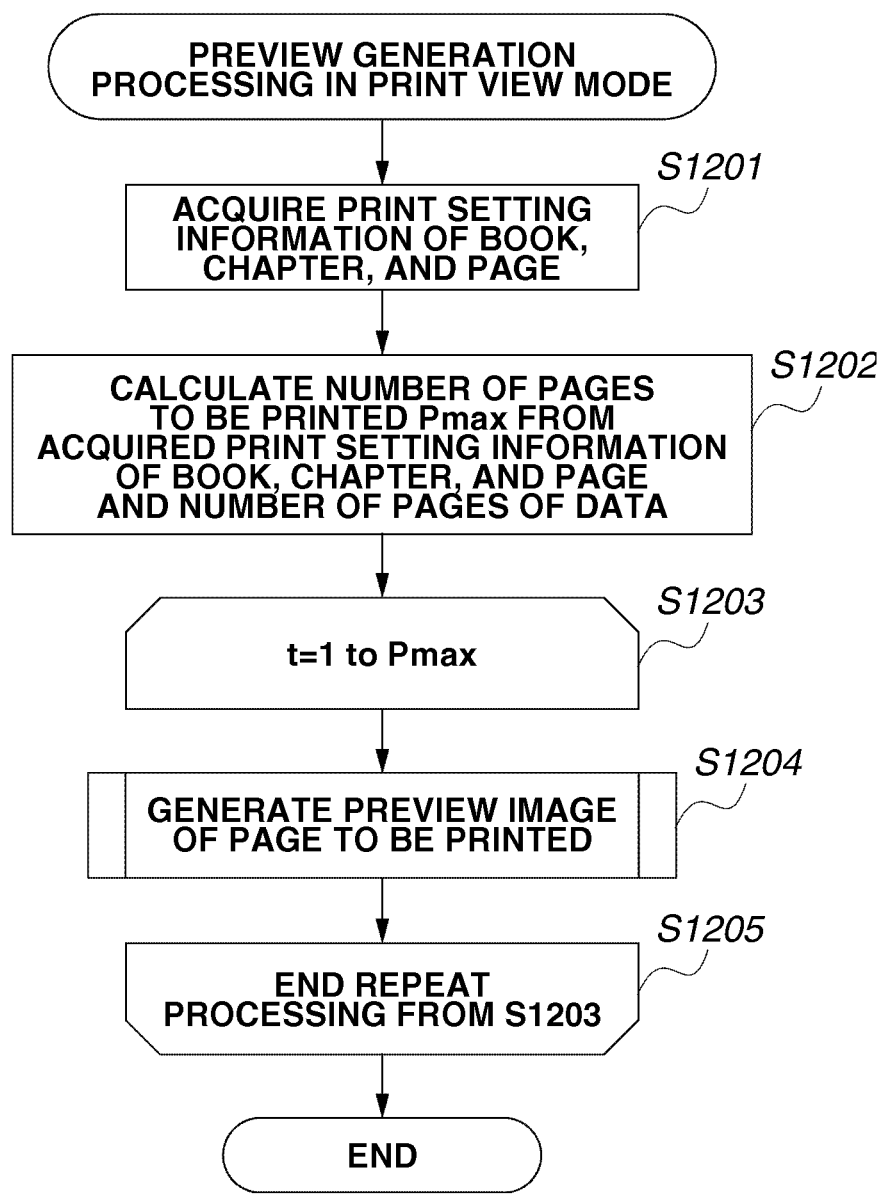
FIG. 12 is a flowchart illustrating an example of procedures for generating a preview image in a print view mode.

FIG. 12 is a flowchart illustrating the preview image generation processing in the print view mode executed by the bookbinding application 104.

In step S1201, the bookbinding application 104 acquires print setting information about a book, a chapter, and a page of the data which are subjected to the preview display.

In step S1202, the bookbinding application 104 calculates a number of pages to be printed using the print setting information acquired in step S1201. More specifically, if the number of the original pages to be printed is 10 pages and 2 in 1 printing is set, then the number of pages to be printed is calculated as 5 pages.

In step S1203, the bookbinding application 104 repeats the processing for the number of pages to be printed. Then in step S1204, the bookbinding application 104 generates a preview image of the I-th page to be printed. Step S1205 is the end of the repeat processing.

Figure 13:
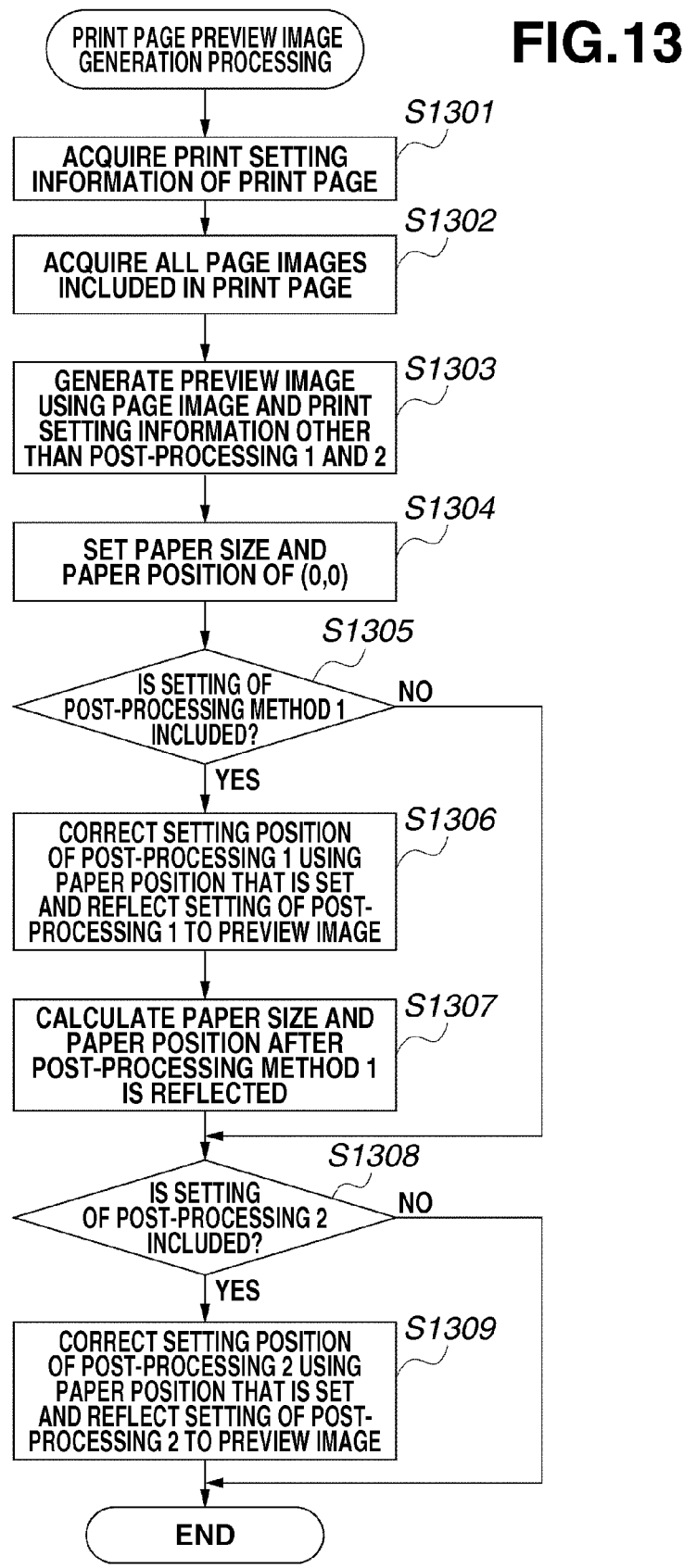
FIG. 13 is a flowchart illustrating an example of procedures for generating a preview image in the print view mode.

FIG. 13 is a flowchart illustrating details of the preview image generation processing and the display control processing performed by the bookbinding application 104.

In step S1301, the bookbinding application 104 acquires print setting information about the first print page.

In step S1302, the bookbinding application 104 acquires the page images of all the original pages placed on the first print page. For example, if "2 in 1" is set in the print setting information about the first page, page images of the first and the second logical pages included in the document data are acquired.

In step S1303, the bookbinding application 104 generates a preview image of a print page using the print setting information acquired in step S1301 but excluding the print setting information concerning the post-processing methods 1 and 2 therefrom, and the page image acquired in step S1302. For example, if the image is set to be printed on an A4 sheet of paper, then an A4 size preview image is generated. At this point, the post-processing method 1 and the post-processing method 2 are not reflected in the preview.

In step S1304, the bookbinding application 104 sets the paper size and the paper position. The paper size set in step S1304 is the same as the paper size included in the print setting information acquired in step S1301. Further, the print paper position is set to the top-left coordinates (0, 0).

In step S1305, the bookbinding application 104 determines whether the setting of the post-processing method 1 is included in the print setting. If the setting of the post-processing method 1 is included (YES in step S1305), the process proceeds to step S1306. If the setting of the post-processing method 1 is not included (NO in step S1305), the process proceeds to step S1308. The processing in step S1305 is determined based on whether information indicating that the post-processing 1 is executed (e.g., cutting: YES) is included in the acquired print setting information.

In step S1306, the bookbinding application 104 reflects the position to which the post-processing method 1 is applied in the preview image. The preview image displayed in step S1306 may be referred to as a first preview image. More specifically, if "cutting" is set in the post-processing method 1, a registration mark image (cutting mark) indicating the cutting position is included in the preview image. If "folding" is set in the post-processing method 1, the folding location is included in the preview image. Further, the position to which the processing of the post-processing method 1 is applied is calculated using the paper size set in step S1304 and the paper size after the post-processing (e.g. "cutting") in the post-processing method 1 is performed. Concrete examples will be described below referring to FIGS. 14A to 14C.

In step S1307, the bookbinding application 104 changes the paper size and the paper position set according to the setting information in the post-processing method 1. More specifically, the paper size is set to the size of the paper after the post-processing method 1 is applied and the paper position is changed to the point of origin of the paper after the post-processing method 1 is applied. Concrete examples will be described below referring to FIGS. 14A to 14C.

In step S1308, the bookbinding application 104 determines whether the setting for the post-processing method 2 is included in the print setting. If the setting is included (YES in step S1308), the process proceeds to step S1309. If the setting is not included (NO in step S1308), the preview image generation processing for the print page is terminated. Since the processing in step S1308 is similar to that performed in step S1305, detailed description of the processing is omitted.

In step S1309, the bookbinding application 104 corrects the position set in the post-processing method 2 using the paper position that is set, and reflects the setting information of the post-processing methods 1 and 2 in the preview image. The preview image displayed in step S1309 may be referred to as a second preview image.

Figure 14A:
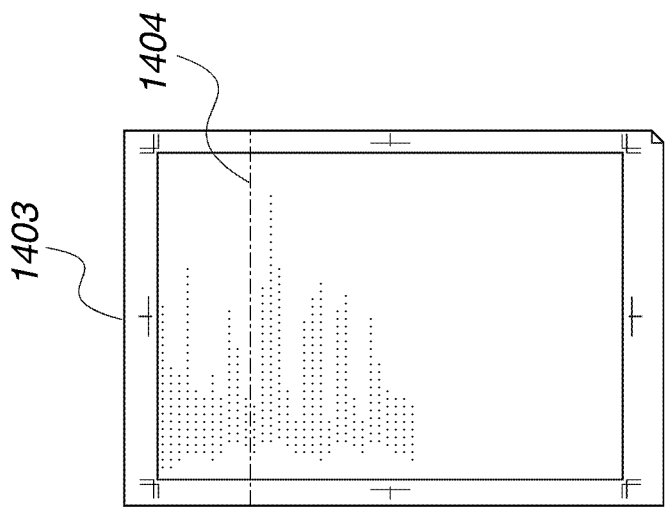
FIGS. 14A to 14C illustrate examples of a preview image displayed in the print view mode.
Figure 14B:
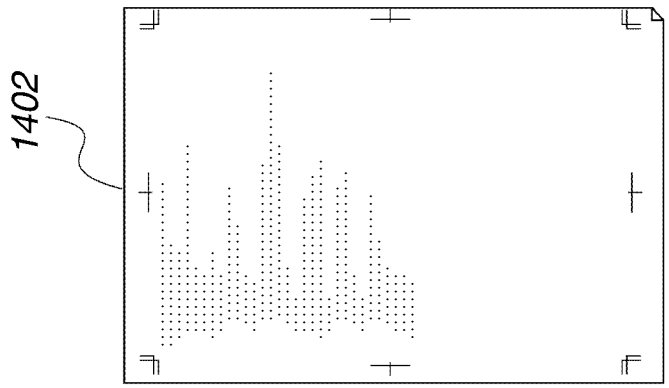
Figure 14C:
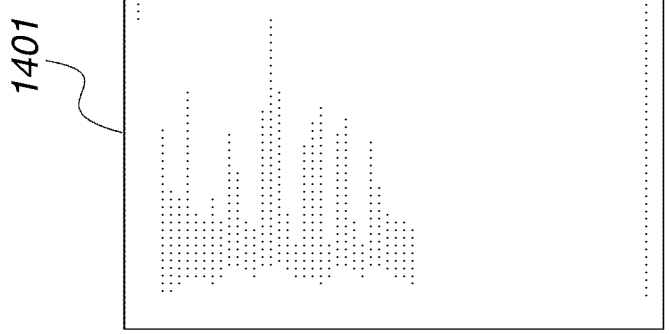

The processing in FIG. 13 is concretely described referring to FIGS. 14A to 14C. It is assumed that the print setting information which includes "print method: one-sided, paper size: A4, paper orientation: portrait", "the post-processing method 1, cutting: YES, cutting size: B5", and "post-processing method 2, crease: YES, position: 50 mm (from top of paper)" is acquired in step S1301.

FIGS. 14A to 14C illustrate preview images of the first page of the print pages in which the above described settings are reflected.

The preview image in FIG. 14A is an image generated according to the processing in step S1303. Since the settings in the post-processing methods 1 and 2 are not reflected, the print settings "print method: one-sided", "paper size: A4", and "paper orientation: portrait" are only reflected in a preview image 1401. Thus, in step S1304, the paper size is set to A4, and the paper position is set to (0, 0).

In the preview image in FIG. 14B, the position on which the cutting set in the post-processing method 1 is applied is reflected according to the processing performed in step S1306. The settings in the post-processing method 1 is "cutting: YES" and "cutting size: B5".

The position of the image is calculated so that a preview image in B5 size that is the size after the cutting is placed at the center of the A4 size paper, and an image with registration marks 1402 indicating the cutting position based on the calculated position is displayed. Since the A4 size is 210*297 mm and the B5 size is 182*257 mm, the upper left corner of the B5 size preview image is set to a position of (14, 20) with respect to an A4 size image so that the B5 size image is set at the center of the A4 size image.

The bookbinding application 104 can determine other three points according to the determination of the above described position. Thus a registration mark can be drawn to each position. Accordingly, the preview image in FIG. 14B can be obtained.

As a result of the above described processing, in step S1307, the paper size is changed from A4 size to B5 size, and the paper position is changed from (0, 0) to (14, 20).

FIG. 14C illustrates a preview image in which the crease setting in the post-processing method 2 is reflected according to the processing in step S1309. Since the paper size is set to B5 and the paper position is set to (14, 20), the bookbinding application 104 uses both settings to display a preview image indicating the position on which the crease set in the post-processing method 2 is executed.

More specifically, since the settings in the post-processing method 2 are "crease: YES" and "crease position: 50 mm (from the top of paper)", the position only in the Y direction is corrected, and a crease line 1404 is displayed 70 mm away from the top of the preview image of the paper size before the cutting. In other words, since the bookbinding application 104 displays the crease line 1404 at the position 70 mm from the top of the preview image of the paper having the size before the cutting so as to reflect "crease position: 50 mm (from the top of paper)" according to the Y coordinate of the set paper position (14, 20). Further, a frame 1403 indicating the size of the paper after the cutting is displayed in the preview image.

Accordingly, the preview image illustrated in FIG. 14C is displayed in the preview section 1102 as a preview image of final print page.

Conventionally, the crease position is displayed 50 mm from the top edge of the paper before the cutting. According to the present exemplary embodiment, the crease position is indicated 50 mm from the top edge of the paper after the paper is cut (namely, 70 mm from the top edge of the paper before the paper is cut).

The preview images in FIGS. 14A to 14C can be changed each time the user sets the post-processing or by an instruction given by the user.

For example, the preview image in FIG. 14B may be displayed when the user sets the setting information concerning the first post-processing method. Further, the preview image in FIG. 14C may be displayed when the user sets the setting information concerning the second post-processing method.

Further, after the user sets the setting information concerning the first and the second post-processing methods, the preview image in FIG. 14B is displayed according to an instruction to display the preview image reflecting the first post-processing, and the preview image in FIG. 14C is displayed according to the instruction to display the preview image reflecting the second post-processing. According to this method, for example, after the preview image in FIG. 14C is displayed according to the setting information concerning the first and the second post-processing methods set by the user, the preview image in FIG. 14B can be displayed according to the user's instruction.

Figure 15C:
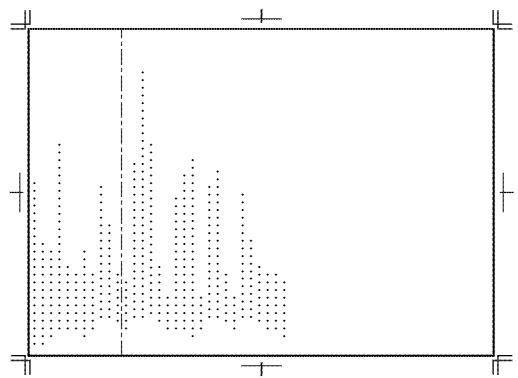
FIGS. 15A to 15C illustrate examples of a preview image in the print view mode.
Figure 15B:
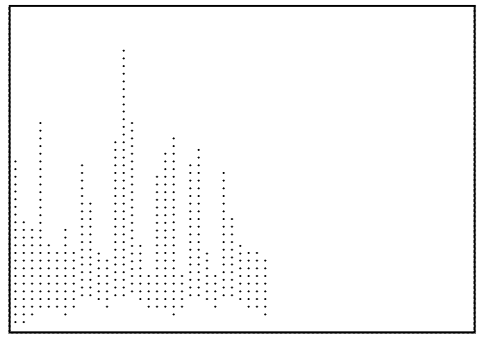
Figure 15A:
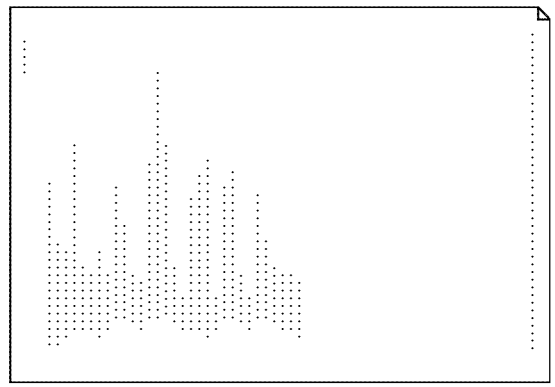

A preview image can be displayed in a sheet with a size after the cutting is actually performed as illustrated in FIGS. 15A to 15C.

If the above described near-line finisher is used, when a print job is transmitted to the printer, post-processing information which is given the same job ID as the print job is also transmitted to the near-line finisher.

The user carries the print product to the near-line finisher and enters the job ID of the print product in the near-line finisher. According to this input, the near-line finisher reads out the post-processing information corresponding to the job ID from the memory, and executes the post-processing according to the post-processing information. A job information sheet on which the job ID printed may be provided on top of the print product so that the user does not enter a wrong job ID in the near-line finisher. The job information sheet can be displayed as a preview image, however, since the post-processing is not applied to the job information sheet, a preview image of the job information sheet to which the post-processing is applied and a preview image of a print page to which the post-processing is applied are displayed.

According to the above described procedures, after the post-processing (the first post-processing), such as cutting, for changing the paper size is executed, a preview image (FIG. 14C) is generated which allows the user to identify the position on which the other post-processing (the second post-processing) is executed. Thus, the user can change the position of the second post-processing by referring to the preview image in FIG. 14C.

According to the description above, although the "cutting" is used as an example of the setting in the post-processing method 1, the present invention can be applied to post-processing which changes the paper size after the post-processing, such as folding, is executed.

Further, the present invention can be achieved when a computer-readable storage medium storing a software program code which realizes functions of the above described embodiment is supplied to an apparatus, and a computer (or a CPU or a MPU) of the apparatus reads and executes the program code stored in the computer-readable storage medium. In this case, the program code read out from the computer-readable storage medium itself realizes the functions of the above described exemplary embodiment and the program code and the computer-readable storage medium which stores the program code constitutes the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-130851 filed May 29, 2009, which is hereby incorporated by reference herein in its entirety.

What is claimed is:

1. An information processing apparatus which can be connected to a printing apparatus and a post-processing apparatus configured to perform post-processing on a sheet output from the printing apparatus, the information processing apparatus comprising:
an identification unit configured to identify a size of the sheet to be changed by executing first post-processing to the sheet output from the printing apparatus;
a designation unit configured to designate a position on which second post-processing is executed to the sheet to which the first post-processing has been executed; and
a display control unit configured to display a preview image for identifying a position on which the second post-processing is executed with respect to the size of the sheet identified by the identification unit based on the size of the sheet identified by the identification unit and the position on which the second post-processing is executed.

2. The information processing apparatus according to claim 1, further comprising:
a determination unit configured to determine a position on which the first post-processing is executed based on the size of the sheet output from the printing apparatus and the size of the sheet identified by the identification unit if the first post-processing is cutting processing for cutting a sheet,
wherein the display control unit displays a first preview image that includes a cutting mark at a position determined by the determination unit.

3. The information processing apparatus according to claim 2, wherein the display control unit displays a second preview image from which a sheet size changed by executing the first post-processing and a position on which the second post-processing is executed with respect to the sheet whose size has been changed can be identified.

4. The information processing apparatus according to claim 3, wherein the display control unit changes display of the first preview image and the second preview image according to an instruction of a user.

5. The information processing apparatus according to claim 3, wherein when a preview image of a job information sheet including information for identifying the post-processing to be executed by the post-processing apparatus is displayed, the display control unit displays the second preview image to which the post-processing has been applied and the preview image of the job information sheet to which the post-processing is not applied.

6. A method for controlling an information processing apparatus which can be connected to a printing apparatus and a post-processing apparatus configured to perform post-processing on a sheet output from the printing apparatus, the method comprising:

identifying a size of the sheet to be changed by executing first post-processing to the sheet output from the printing apparatus;

designating a position on which second post-processing is executed to the sheet to which the first post-processing has been executed; and displaying a preview image for identifying a position on which the second post-processing is executed with respect to the identified size of the sheet based on the identified size of the sheet and the position to which the second post-processing is to be executed.

7. A non-transitory computer-readable medium storing a program which can be read by an information processing apparatus connectable to a printing apparatus and a post-processing apparatus configured to perform post-processing on a sheet output from the printing apparatus, wherein the program is for causing the information processing apparatus to execute processing comprising:

identifying a size of the sheet to be changed by executing first post-processing to the sheet output from the printing apparatus;

designating a position on which second post-processing is executed to the sheet to which the first post-processing has been executed; and displaying a preview image for identifying a position on which the second post-processing is executed with respect to the identified size of the sheet based on the identified size of the sheet and the position to which the second post-processing is to be executed.

* * * * *